United States Patent
Maurin et al.

(10) Patent No.: US 10,014,804 B1
(45) Date of Patent: Jul. 3, 2018

(54) MOTOR STARTING METHODS AND APPARATUS USING OUTPUT VOLTAGE CONTROL BASED ON SOURCE VOLTAGE

(71) Applicant: Eaton Corporation, Cleveland, OH (US)

(72) Inventors: John David Maurin, Arden, NC (US); Ryan Kenneth Keating, Bear, DE (US); Benjamin Stewart Wells, Arden, DE (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/644,181

(22) Filed: Jul. 7, 2017

(51) Int. Cl.
*H02P 23/00* (2016.01)
*H02P 1/28* (2006.01)

(52) U.S. Cl.
CPC ..................................... *H02P 1/28* (2013.01)

(58) Field of Classification Search
CPC ...... H02P 1/00; H02P 3/00; H02P 6/00; H02P 21/00; H02P 27/04; H02P 27/06; H02P 41/00; H02H 7/08; H02H 7/09
USPC ..... 318/400.01, 400.14, 700, 701, 721, 799, 318/800, 801, 727, 400.21, 400.22, 805; 363/21.1, 40, 44, 95, 120, 174, 175; 388/800, 903, 917
See application file for complete search history.

(56) References Cited

U.S. PATENT DOCUMENTS

| | | | | |
|---|---|---|---|---|
| 6,586,905 B1* | 7/2003 | Johnson | ..................... | H02P 3/18 318/700 |
| 7,414,377 B2* | 8/2008 | Mayhew | .................. | H02P 27/16 318/432 |
| 2004/0155622 A1* | 8/2004 | Mayhew | .................... | H02P 1/28 318/778 |

OTHER PUBLICATIONS

*Solid-state soft start motor controller and starter*; Application Paper AP 03902001E (Eaton Corp. 2011) 32 pages.

* cited by examiner

*Primary Examiner* — Antony M Paul
(74) *Attorney, Agent, or Firm* — Ward and Smith, P.A.

(57) ABSTRACT

Methods of starting a motor include coupling the motor to an AC power source via a switching circuit of a motor starter, detecting an output voltage produced by the switching circuit and responsively changing the output voltage and detecting an input voltage from the AC power source and responsively controlling a rate of change of the output voltage. Controlling the rate of change of the output voltage may include reducing a rate of increase of a magnitude of the output voltage responsive to detecting that the input voltage meets a first criterion. The methods may further include bypassing the switching circuit to connect the motor to the AC power source responsive to the output voltage meeting a second criterion or an output current provided to the motor meeting a third criterion.

18 Claims, 3 Drawing Sheets

MOTOR STARTING METHODS AND APPARATUS USING OUTPUT VOLTAGE CONTROL BASED ON SOURCE VOLTAGE

BACKGROUND

The inventive subject matter relates to motor control apparatus and methods of operation thereof, more particularly, to motor starters and methods of operating the same.

Motor starters are commonly used with industrial electric motors. Typical solid-state motor starters control starting characteristics to meet application requirements, including acceleration and deceleration time, starting current and motor torque. Soft starters are commonly used to limit inrush current when the motor is first coupled to a power source. Large inrush currents may cause voltage dips that may negatively affect other loads coupled to the same source.

Soft motor starters may control voltage and/or current provided to the motor. For example, some soft starters may use silicon-controlled rectifiers (SCRs) that are connected in series between the power source and the load. During a startup process, the SCRs may be selectively gated "on" to gradually increase the speed of the motor. When the motor has reached a desired speed, a bypass contactor may be closed to bypass the SCRs and reduce losses. Operations of soft motor starters are described in "Solid-state soft start motor controller and starter," Application Paper AP 03902001E (Eaton Corp. 2011).

When a motor is started with a reduced voltage soft starter (RVSS), the motor current may be limited to prevent a sag or brownout in the line voltage provided to the starter. Commonly, a current limit of the starter may be adjusted to achieve a value that is suitable for the site conditions, e.g., a value that provides a desirable starting performance without introducing an undesirable degree of input voltage dip. However, line conditions may be subject to change due to stiffness of the utility source and system loading conditions. This often results in setting the current limit at a level that corresponds to a worst case line condition, which can result in suboptimal starting performance.

SUMMARY

Some embodiments of the inventive subject matter provide methods of method of starting a motor. The methods include coupling the motor to an AC power source via a switching circuit of a motor starter, detecting an output voltage produced by the switching circuit and responsively changing the output voltage and detecting an input voltage from the AC power source and responsively controlling a rate of change of the output voltage. Controlling the rate of change of the output voltage may include reducing a rate of increase of a magnitude of the output voltage responsive to detecting that the input voltage meets a first criterion.

According to further embodiments, the methods may further include bypassing the switching circuit to connect the motor to the AC power source responsive to the output voltage meeting a second criterion or an output current provided to the motor meeting a third criterion. The second criterion may include a magnitude of the output voltage meeting a maximum value. The third criterion may include a magnitude of the output current falling below a threshold.

According to some embodiments, reducing the rate of increase of the magnitude of the output voltage responsive to detecting that a voltage from the AC power source meets a first criterion may include reducing the increase in the magnitude of the output voltage to a rate that maintains a magnitude of the input voltage above a first threshold and maintains a magnitude of output current below a second threshold. The first criterion may include a magnitude of the input voltage decreasing below a threshold.

The methods may further include reducing the rate of increase in the magnitude of the output voltage responsive to detecting that the output current meets a fourth criterion. The fourth criterion may include the output current exceeding a threshold.

Further embodiments provide a motor starter including a switching circuit configured to selectively couple an AC source to a motor, a bypass switch configured to selectively couple the AC source to the motor to bypass the switching circuit, and a control circuit configured to detect an output voltage produced by the switching circuit and responsively operate the switching circuit to control the output voltage and to detect an input voltage from the AC source and responsively control a rate of change of the output voltage responsive to the detected input voltage. The control circuit may be configured to reduce a rate of increase of a magnitude of the output voltage responsive to detecting that the input voltage meets a first criterion. The control circuit may be further configured to operate the bypass circuit to connect the motor to the AC power source responsive to the output voltage meeting a second criterion or an output current provided to the motor meeting a third criterion.

In some embodiments, the second criterion may include a magnitude of the output voltage meeting a maximum value. The third criterion may include a magnitude of the output current falling below a threshold.

In further embodiments, the control circuit may be configured to reduce the rate of increase of the magnitude of the output voltage to a rate that maintains a magnitude of the input voltage above a first threshold and maintains a magnitude of output current below a second threshold. The first criterion may include a magnitude of the input voltage decreasing below a threshold.

The control circuit may be further configured to reduce the rate of increase of the magnitude of the output voltage responsive to detecting that the output current meets a fourth criterion. The fourth criterion may include the output current exceeding a threshold.

DETAILED DESCRIPTION

Figure 1:
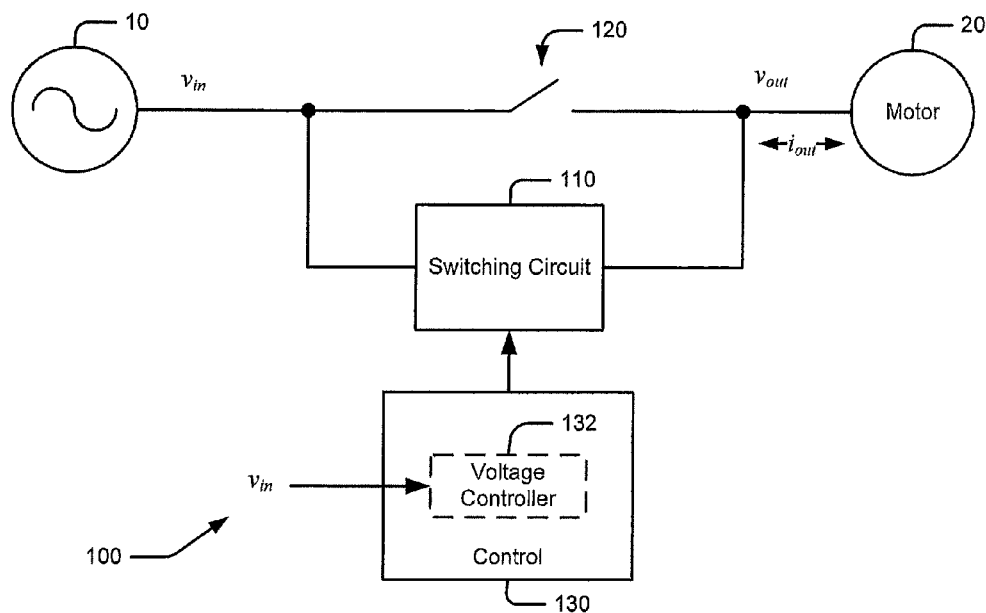
FIG. 1 is a schematic diagram illustrating a motor starter apparatus according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from a realization that improved motor starter performance may be achieved by controlling an output voltage produced by the motor starter responsive to an input voltage applied to the starter so that undesirable dips in the input voltage may be reduced or eliminated, while still providing a desirable level of starter performance under a variety of input source conditions. For example, in some embodiments, a motor starter may ramp up its output voltage at an initial rate and, responsive to detecting that the input voltage magnitude falling below a threshold, may decrease the rate of increase of the output voltage to a level that maintains the input voltage magnitude above the threshold level. The reduced rate of increase may be maintained until the starter reaches a condition, such as a condition that warrants closing a bypass switch of the starter or a condition that indicates the motor has stalled, necessitating deactivation of the starter. These input voltage oriented approaches enable the motor starter to operate with a current limit that allows for increased performance under favorable line conditions while protecting against undesirable input voltage dips.

FIG. 1 illustrates a motor starter 100 according to some embodiments of the inventive subject matter. The starter 100 includes a switching circuit 110 configured to selectively couple an AC source 10 to a motor 20. The starter 100 may be a three-phase starter, and the switching circuit 110 may include, for example, a plurality of thyristor circuits (e.g., anti-parallel connected silicon controlled rectifiers (SCRs)), respective ones of which control respective phase output voltages applied to the motor 20. The starter 100 further includes a bypass switch 120 (e.g., a three-phase contactor) configured to couple the power source 10 directly to the motor 20, thus bypassing the switching circuit 110. A control circuit 130 controls the switching circuit 110 and the bypass switch 120. Generally, the control circuit 130 is configured to provide a soft start operation in which switches of the switching circuit 110 are modulated while the bypass switch 120 is open to gradually accelerate the motor 20. Once the motor 20 has reached a desired state, the bypass switch 120 may be closed and the switching circuit 110 deactivated.

Figure 2:
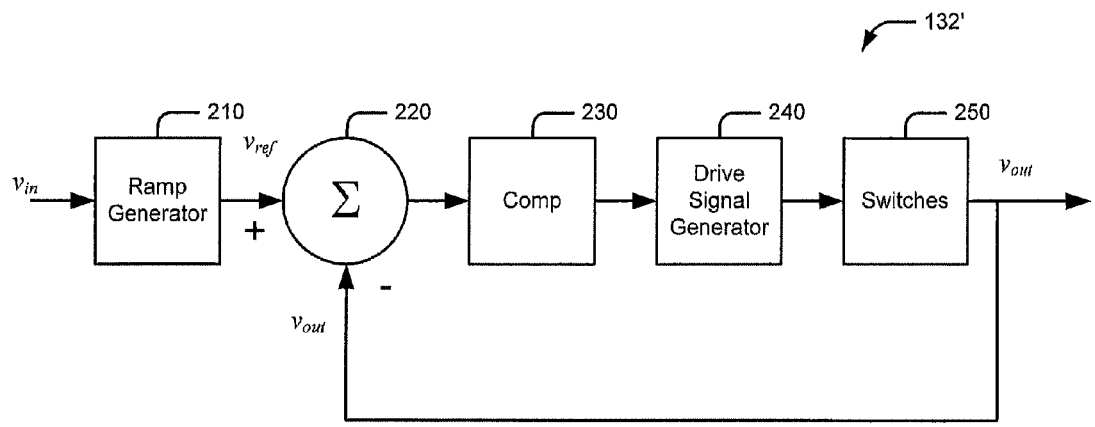
FIG. 2 is a schematic diagram illustrating an output voltage control architecture for the motor starter apparatus of FIG. 1.

As further illustrated, the control circuit 130 may be configured to implement a voltage controller 132 that controls an output voltage $v_{out}$ produced by the switching circuit 110. An example of such a voltage controller 132' is illustrated in FIG. 2. A ramp generator 210 generates a voltage reference signal $v_{ref}$ that is controlled responsive to the input voltage $v_{in}$ applied to the motor starter by the power source 10. The voltage reference signal $v_{ref}$ is compared to an output voltage feedback signal $v_{out}$ produced by the switching circuit 110 at a summing junction 220, thus developing an error signal that is provided to a compensator 230. The compensator 230 may implement any of a number of different compensation functions, such as pole compensation, filtering, hysteresis and the like. The compensator 230 produces a signal that is received by a drive signal generator 240, which generates drive signals that control switches 250 of the switching circuit 110 to produce the output voltage $v_{out}$ applied to the motor 20. It will be appreciated the controller 132' may be implemented using any of a variety of analog and digital circuits. For example, the ramp generator 210, summing junction 220, compensator 230 and drive signal generator 240 may be implemented using computer program code executing on a microcontroller or similar device, along with peripheral analog and/or digital circuitry to support the functions illustrated. It will be further appreciated that analog control circuitry having similar functionality may also be used.

Responsive to a detected magnitude of the input voltage $v_{in}$, a rate of change of the output voltage $v_{out}$ can be controlled. For example, a rate of increase of a magnitude of the output voltage $v_{out}$ can be decreased by slowing the ramp up of the reference voltage signal $v_{ref}$ when the magnitude of the input voltage $v_{in}$ falls below a threshold representing an undesirable level of input voltage dip. The voltage controller 132' may also slow the ramp up of the reference voltage signal $v_{ref}$ responsive to an output current $i_{out}$ provided to the motor 20 reaching a threshold level. When the output current $i_{out}$ falls to a level indicating that the motor 20 has a reached a desired speed and/or when the switching circuit 110 is applying a maximum output voltage $v_{out}$ to the motor 20, the control circuit 130 may cause the bypass switch 120 to close. The control circuit 130 may also be configured to detect when a stalled condition exists, e.g., when the rate of change in the output voltage $v_{out}$ falls below a threshold indicating that the motor 20 cannot be further accelerated without causing an unacceptable dip in the input voltage $v_{in}$ or an increase in the output current $i_{out}$ above a current limit.

Figure 3:
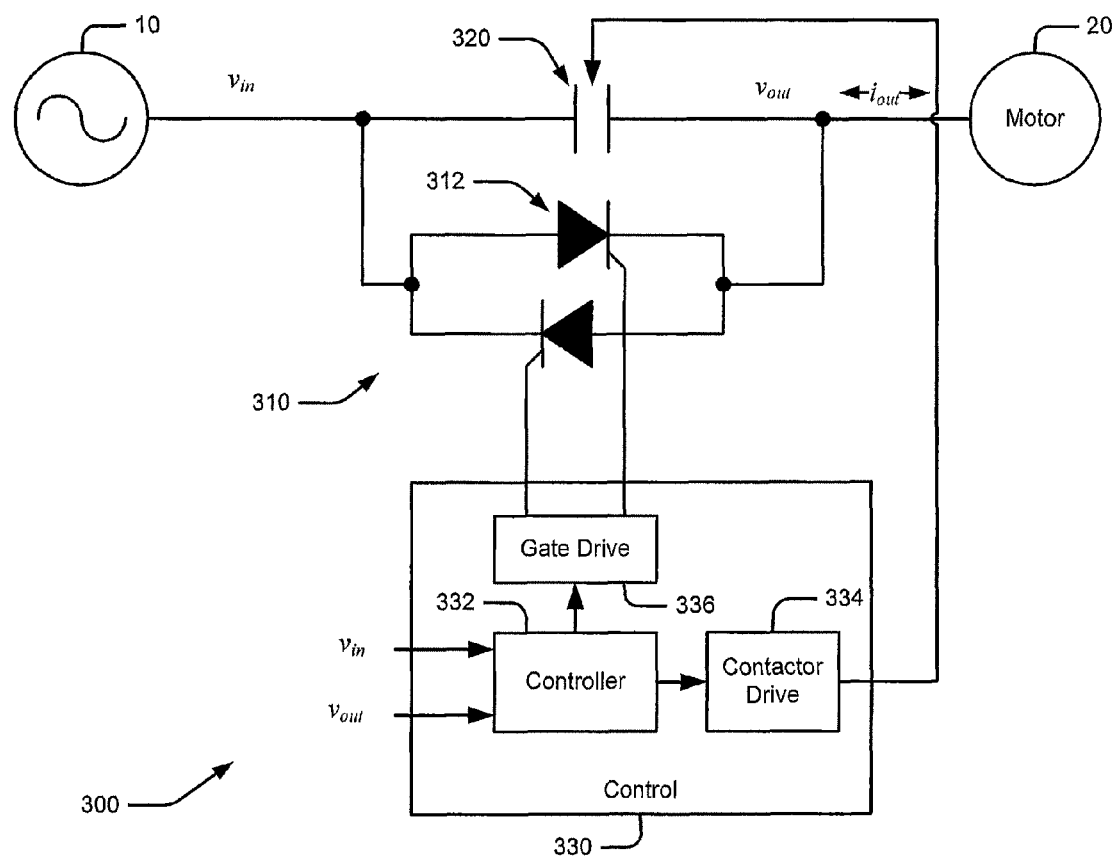
FIG. 3 is a schematic diagram illustrating a motor starter apparatus according to further embodiments.

FIG. 3 illustrates an example of a motor starter 300 according to further embodiments. The starter 300 includes a switching circuit 310 including anti-parallel connected silicon-controlled rectifiers (SCRs) 312. FIG. 3 illustrates a single pair of parallel-connected SCRs 312, but it will be appreciated that the motor may include sets of such parallel-connected SCRs 312 to control respective phases. Gate terminals of the SCRs 312 may be driven by a gate drive circuit 336 of a control circuit 330. The gate drive circuit 336 is controlled by a controller 332, which may include, for example, a DSP-based microcontroller or similar device. The controller 332 may also control a contactor drive circuit 334 that drives a bypass contactor 320. The controller 332 may implement an output voltage control architecture along the lines described above with reference to FIG. 2, controlling a ramp up of a magnitude of an output voltage $v_{out}$ produced by the switching circuit 310 responsive the input voltage $v_{in}$ applied to the switching circuit 310.

Figure 4:
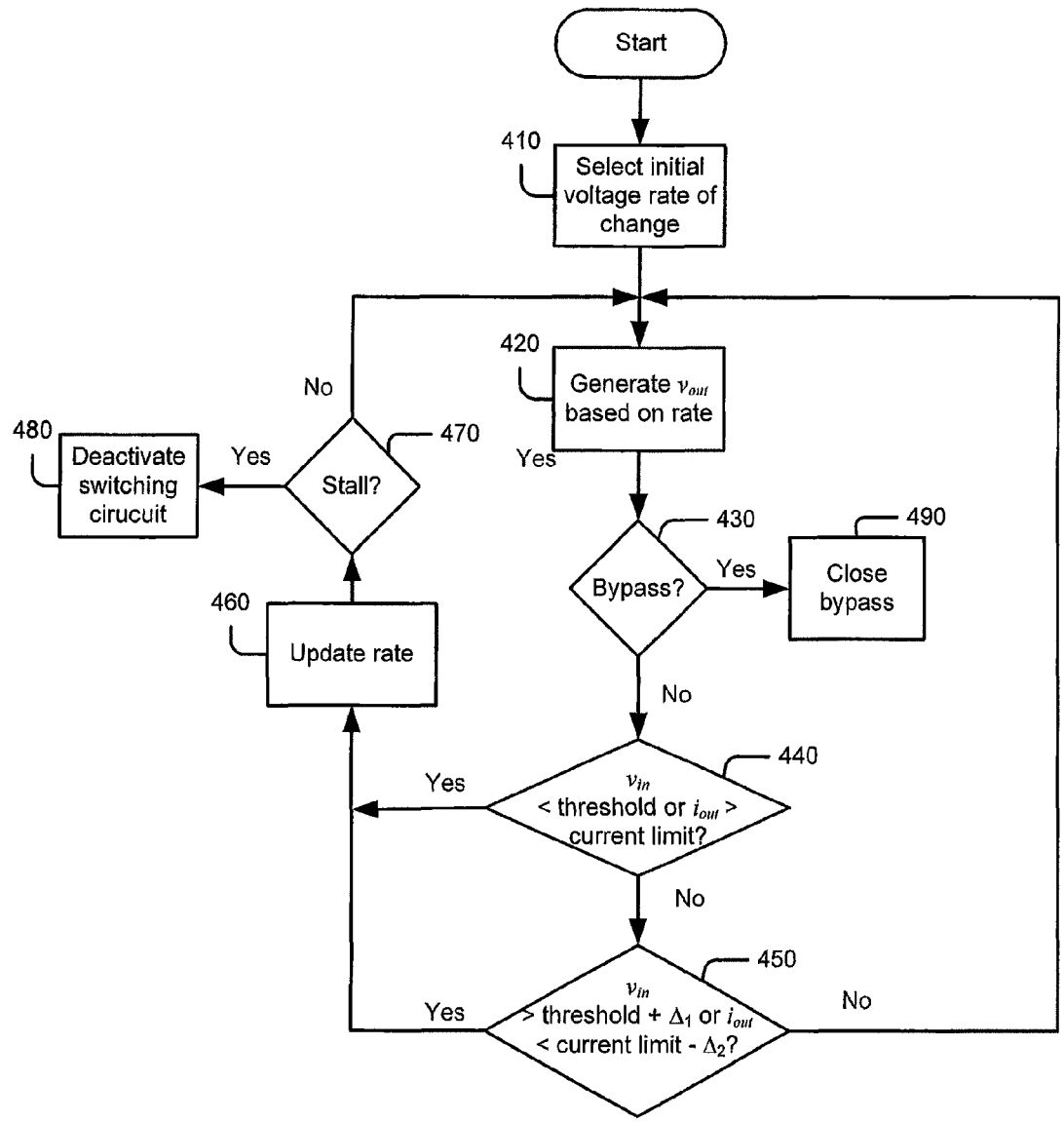
FIG. 4 is a flowchart illustrating operations of the apparatus of FIG. 3 according to some embodiments.

FIG. 4 illustrates exemplary operations of the starter 300 according to some embodiments. The motor starter 300 selects an initial rate of a desired increase in a magnitude (e.g., an RMS level or other measure of magnitude) of the output voltage $v_{out}$ to be applied to the motor 20 (block 410). The starter 300 may first apply an initial voltage sufficient to start the motor spinning, and then begin to increase the magnitude of the output voltage $v_{out}$ at the selected rate (block 420). If no condition warranting closure of the bypass contactor 320 (block 430) occurs while the voltage magnitude is ramping up, the starter 300 continues to ramp up at the selected rate. Conditions warranting closure of the bypass contactor 320 may include, for example, a magnitude (e.g., an RMS value) of the output current $i_{out}$ falling below a certain threshold that indicates that the motor has achieved a desired speed, or the magnitude of the output voltage $v_{out}$ increasing to a maximum level, i.e., the SCR's 312 are continuously in a conduction state throughout respective positive and negative half cycles of the input voltage $v_{in}$ such that the switching circuit 310 can provide no further increase in voltage.

If, during the ramp up of the magnitude of the output voltage $v_{out}$, either the magnitude of the input voltage $v_{in}$ falls below a certain threshold or the magnitude of the output current $i_{out}$ exceeds a current limit threshold (block 440), the rate of increase of the magnitude of the output voltage $v_{out}$ may be decreased (block 460), and the ramp up continued at the reduced rate. In some embodiments, if the magnitude of the input voltage $v_{in}$ increases above the minimum input voltage threshold by a certain amount $\Delta_1$ and the magnitude of the output current $i_{out}$ falls below the current limit threshold by a certain amount $\Delta_2$ (block 450) indicating a more favorable source and/or load condition, the rate of increase of the magnitude of the output voltage $v_{out}$ may also be increased (block 460) so that acceleration of the motor 20 can be increased.

The rate may be recursively updated as described above to tailor the rate of increase of the output voltage magnitude to source conditions. For example, after incrementally reducing the rate of increase by a certain amount (block 460), the starter 300 may apply the reduced rate (block 420). If this new rate still results in the magnitude of the input voltage $v_{in}$ remaining below the acceptable level or the magnitude of the output current $i_{out}$ exceeding the current limit (block 440), the rate of increase in the magnitude of the output voltage $v_{out}$ can again be reduced until a rate is reached that keeps the magnitude of the input voltage $v_{in}$ above the desired minimum level and the magnitude of the output current $i_{out}$ below the current limit threshold. The ramp up may continue at this rate until a condition warranting closure of the bypass switch 320 is achieved and the bypass switch 320 is closed (blocks 430, 470). If the satisfied bypass condition is the output voltage $v_{out}$ reaching its maximum magnitude (SCRs 312 continuously conducting), but the magnitude of the current $i_{out}$ is above a level that indicates that the motor 20 is operating at desired speed, an overload trip may occur after the bypass contactor 320 closes.

If the rate of output voltage change decreases to a certain level (e.g., substantially zero) for a predetermined amount of time, this may be indicative of a malfunction wherein the motor cannot be brought up to full speed in a desirable amount of time without causing the input voltage $v_{in}$ to drop to an undesirable level and/or the output current $i_{out}$ to exceed the current limit (e.g., a current level that might damage the starter 300 or other equipment). When such a condition is detected (block 470), the switching circuit 210 may be deactivated (block 480) and motor starting operations terminated.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A method of starting a motor, the method comprising:
coupling the motor to an AC power source via a switching circuit of a motor starter;
detecting an output voltage produced by the switching circuit and responsively changing the output voltage; and
detecting an input voltage from the AC power source and responsively controlling a rate of change of the output voltage.

2. The method of claim 1, wherein controlling the rate of change of the output voltage comprises reducing a rate of increase of a magnitude of the output voltage responsive to detecting that the input voltage meets a first criterion.

3. The method of claim 2, further comprising bypassing the switching circuit to connect the motor to the AC power source responsive to the output voltage meeting a second criterion or an output current provided to the motor meeting a third criterion.

4. The method of claim 3, wherein the second criterion comprises a magnitude of the output voltage meeting a maximum value.

5. The method of claim 3, wherein the third criterion comprises a magnitude of the output current falling below a threshold.

6. The method of claim 3, wherein reducing the rate of increase of the magnitude of the output voltage responsive to detecting that a voltage from the AC power source meets a first criterion comprises reducing the rate of increase in the magnitude of the output voltage to a rate that maintains a magnitude of the input voltage above a first threshold and maintains a magnitude of the output current below a second threshold.

7. The method of claim 3, wherein the first criterion comprises a magnitude of the input voltage decreasing below a threshold.

8. The method of claim 3, further comprising reducing the rate of increase in the magnitude of the output voltage responsive to detecting that the output current meets a fourth criterion.

9. The method of claim 8, wherein the fourth criterion comprises the output current exceeding a threshold.

10. A motor starter comprising:
a switching circuit configured to selectively couple an AC source to a motor;
a bypass switch configured to selectively couple the AC source to the motor to bypass the switching circuit; and
a control circuit configured to detect an output voltage produced by the switching circuit and responsively operate the switching circuit to control the output voltage and to detect an input voltage from the AC source and responsively control a rate of change of the output voltage responsive to the detected input voltage.

11. The motor starter of claim 10, wherein the control circuit is configured to reduce a rate of increase of a magnitude of the output voltage responsive to detecting that the input voltage meets a first criterion.

12. The motor starter of claim 11, wherein the control circuit is further configured to operate the bypass circuit to connect the motor to the AC source responsive to the output voltage meeting a second criterion or an output current provided to the motor meeting a third criterion.

13. The motor starter of claim 12, wherein the second criterion comprises a magnitude of the output voltage meeting a maximum value.

14. The motor starter of claim 12, wherein the third criterion comprises a magnitude of the output current falling below a threshold.

15. The motor starter of claim 12, wherein the control circuit is configured to reduce the rate of increase of the magnitude of the output voltage to a rate that maintains a magnitude of the input voltage above a first threshold and maintains a magnitude of output current below a second threshold.

16. The motor starter of claim 12, wherein the first criterion comprises a magnitude of the input voltage decreasing below a threshold.

17. The motor starter of claim 12, wherein the control circuit is further configured to reduce the rate of increase of the magnitude of the output voltage responsive to detecting that the output current meets a fourth criterion.

18. The motor starter of claim 17, wherein the fourth criterion comprises the output current exceeding a threshold.

\* \* \* \* \*

UNITED STATES PATENT AND TRADEMARK OFFICE
CERTIFICATE OF CORRECTION

PATENT NO. : 10,014,804 B1  
APPLICATION NO. : 15/644181  
DATED : July 3, 2018  
INVENTOR(S) : John David Maurin, Ryan Kenneth Keating and Benjamin Stewart Wells It is certified that error appears in the above-identified patent and that said Letters Patent is hereby corrected as shown below:

On the Title Page

Please change Inventor 3 (Wells) state of residence from "DE" to -- NC --.

Signed and Sealed this
Twenty-eighth Day of August, 2018

Andrei Iancu
*Director of the United States Patent and Trademark Office*